United States Patent [19]

Frantom et al.

[11] Patent Number: 5,033,772
[45] Date of Patent: Jul. 23, 1991

[54] HYBRID INFLATOR

[75] Inventors: Richard L. Frantom, Richmond; Robert M. Kremer, Fraser; David A. Pickett, Roseville, all of Mich.

[73] Assignee: Allied-Signal Inc., Morris Township, Morris County, N.J.

[21] Appl. No.: 471,590

[22] Filed: Jan. 29, 1990

[51] Int. Cl.$^5$ .............................................. B60R 21/26
[52] U.S. Cl. ..................................... 280/737; 280/741
[58] Field of Search ............... 280/736, 737, 740, 741, 280/728

[56] References Cited

U.S. PATENT DOCUMENTS

| Re. 28,164 | 9/1974 | Stephenson | 280/737 |
|---|---|---|---|
| 3,756,621 | 9/1973 | Lewis | 280/741 |
| 3,895,821 | 7/1975 | Schotthoefer | 280/737 |
| 3,966,226 | 6/1976 | Roth | 280/737 |
| 3,985,076 | 10/1976 | Schneiter | 280/741 |
| 4,866,930 | 9/1989 | Fling | 60/250 |

Primary Examiner—Charles A. Marmor
Assistant Examiner—Karin Tyson

[57] ABSTRACT

A hybrid inflator (10) for a cushion or air bag comprising: a pressure vessel means (16) for storing a volume of stored gas at an elevated pressure, including at least one opening (22) adapted to communicate gas within the pressure vessel to a cushion (84), a mixing chamber (60) defining a volume significantly smaller than the remaining volume of the pressure vessel; a disk (70) for providing a rupturable seal in the pressure vessel; a heat and gas generator (30,32,40,42,52,54) responsive to a control signal, for generating heated media for increasing the temperature of the stored gas at least in the mixing chamber (60), and for directing the heated media into the mixing chamber (60) and onto the disk for opening same.

2 Claims, 1 Drawing Sheet

HYBRID INFLATOR

BACKGROUND AND SUMMARY OF INVENTION

This invention generally relates to a safety apparatus for a motor vehicle such as an automobile and particularly to an apparatus for inflating a cushion or air bag with gas upon collision of the vehicle.

Inflatable bag restraint systems have been shown to reduce the seriousness and number of fatalities resulting in motor vehicle accidents. There exists a number of means for inflating an air cushion or air bag such as utilizing a quantity of stored gas which is selectively released to expand the air bag. Alternatively, a gas source derived from a gas generating material propellant such as sodium azide, which upon ignition thereof generates a sufficient quantity of gas to expand the air bag. The third type of gas source results from a combination of the stored compressed gas and a gas generating or enhancing material. This last device is often referred to as an augmented gas or hybrid inflater. Various hybrid inflaters have been shown in the past such as those illustrated in U.S. Pat. Nos. 3,756,621 and 3,895,821. The inflater shown in U.S. Pat. No. 3,756,621 uses a separate squib or initiator to ignite the propellant and an actuator to open an exit passage to initiate compressed gas flow. U.S. Pat. No. 3,895,821 mounted a single squib outside the pressurized environment of the pressure vessel to ignite the propellant. In the present invention, a single squib and propellant chamber or housing is placed in a compressed inert gas environment. Upon initiation of the propellant, a heated media is generated comprising hot gas and particulates which are directed by a discharge nozzle into a small mixing cavity or chamber adjacent a rupturable disk causing same to burst, initiating gas flow into an air bag. Hot gases continue to be emitted from the propellant chamber and mix with the cold pressurized gas in a small mixing chamber before continuing into the bag to inflate same. The present invention yields an advantage in relation to the prior art in that the number of leak passages are reduced, a faster onset of gas flow is achieved, and by placing the propellant and squib within the compressed gas, yields an improved (dry) environment for the protection of the propellant and squib.

It is an object of the present invention to provide a hybrid inflater which can rapidly and efficiently generate a sufficient quantity of gas to inflate a cushion or air bag during a vehicle crash situation.

Accordingly, the invention comprises an inflater for a cushion or air bag comprising: pressure vessel means for storing a volume of inert gas at an elevated pressure, including at least one opening adapted to communicate gas within the pressure vessel to a cushion. A mixing chamber is provided directly upstream of the nozzle defining a volume significantly smaller than the remaining volume of the pressure vessel. A rupturable disk is placed at one end of the heated mixing chamber for opening the pressure vessel and generating means responsive to a control signal generates a quantity of generated heated media (gas flame and/or some particulate matter) which impinge directly as the disk weakening same to the point of rupture. The heated media mixes with the stored gas increasing its volume to supplement the pressure of the stored gas in effect to supplement the pressure of the stored inert gas.

Many other objects and purposes of the invention will be clear from the following detailed description of the drawings.

DETAILED DESCRIPTION OF THE DRAWINGS

Figure 1:
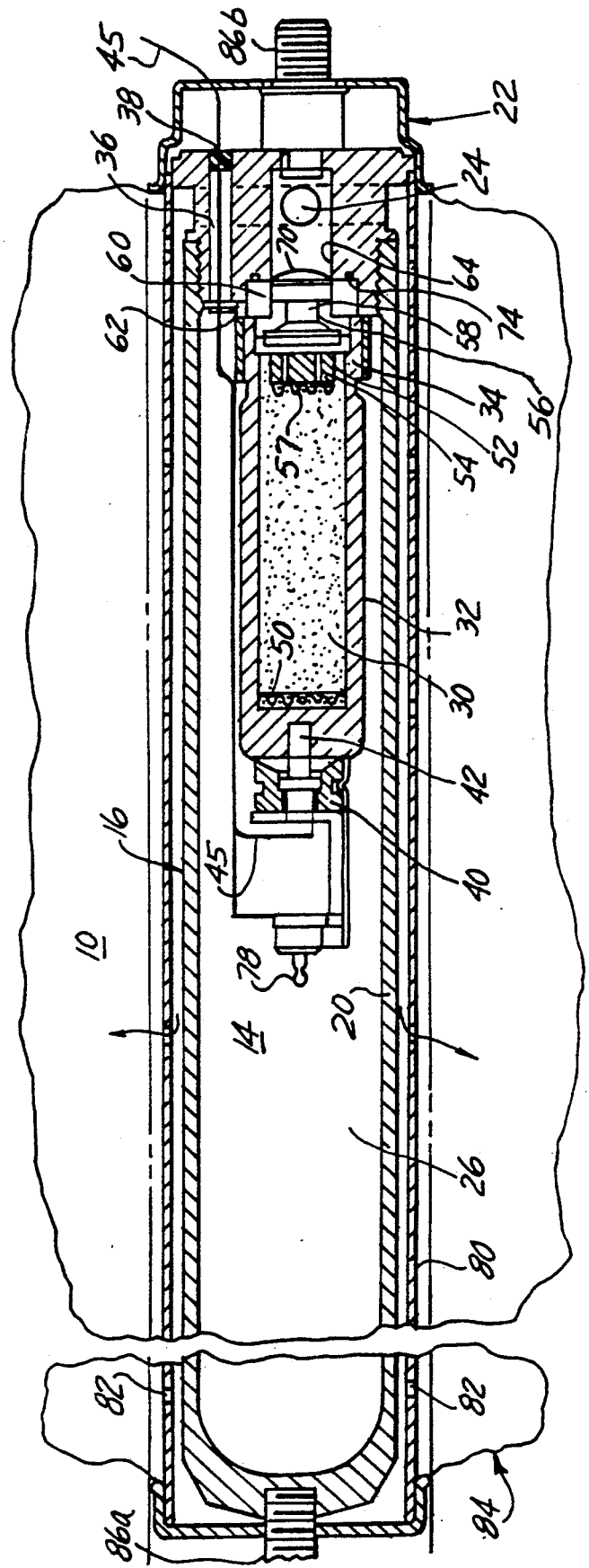
FIG. 1 illustrates a cross-sectional view of a hybrid inflater in accordance with the present invention.

The present invention comprises an inflation apparatus 10, also referred to as a hybrid inflater. This hybrid inflater 10 comprises a means for storing pressurized gas 14 such as a pressure vessel 16. The pressure vessel 16 comprises a substantially elongated main housing 20 sealed at one end by an end cap 22. The end cap is provided with at least one opening 24 to communicate gases to an air cushion 84 or air bag. Positioned in close proximity to the end cap is a quantity of heat generating material 30. Such material 30 may be a propellant such as Arcite as disclosed in U.S. Pat. No. 3,723,205, incorporated herein by reference. The burning of the propellant will produce heated media including an intense flame, a quantity of heated gas and some heated particulate matter. More particularly, the material 30 is stored within an inner housing 32 positioned generally co-linear to and spaced from the main housing 20 and secured at one end 34 to the end cap 22. The housings 32 and 20 cooperate to define a relatively large volume 26 for storage of an inert gas 14 such as Argon. The inert gas is initially placed into the pressure vessel 16 through an inlet 36, or fill tube or similar device, which is thereafter closed by a pressure seal 38 or similar means such as a crimp in an inlet or fill tube (not shown). The pressure of the inert gas 14 may be in the range of 6.9 mega Pascal (1000 psi) to 27.6 mega Pascal (4000 psi), however, a pressure of 20.7 mega Pascal (3000 psi) is thought to be suitable for the present application. At one end of the inner housing is a retainer 40 for securing in close proximity to the material 30 actuating means 42 including a pyrotechnic squib or initiator or the like. The squib 42 is typically internally connected with a resistance wire in a known manner which will produce a suitably high temperature to ignite the squib in response to an electric signal. The wires 45 leading to the squib are sealed by a pressure seal as they exit the pressure vessel 16. A reduced number of leak paths can be achieved by feeding the wires 45 through the inlet pressure seal 38 as opposed to through another opening in the pressure vessel 16 or end cap 22. The material 30 is thereafter ignited by the squib. Disposed between the squib 42 and the material 30 may be a screen-like element 50, the purpose of which is to distribute the heat generated at the squib in a uniform manner to the material 30. The screen also filters any particulate matter. Disposed proximate the other end of the inner housing 32 is a diffuser 52 comprising a plurality of passages 54 therethrough. The passages 54 evenly distribute the pressure and heat of the generated gas and generated heat over its surface. In addition, the diffuser causes the gas generated by the gas generating material to move into the nozzle at a uniform pressure and velocity. A separate screen or strainer 57 may be joined to the diffuser, or fabricated integrally therewith to prevent any particulates generated by the material 30 from entering the cushion.

Situated downstream of the diffuser is preferably a convergent nozzle 56 having an elongated central passage 58 extending into a mixing chamber 60 through which the gases generated by the material 30 may enter. The nozzle also concentrates the heated media or flame front generated by the material 30. The inner housing 32 and nozzle 56 are fitted within a recess formed to the end cap 22 so as to define therebetween the mixing chamber 60 having a volume small compared to the remaining volume 26 of the pressure vessel 16. The inflater includes means for communicating the inert gas to the mixing chamber. Such means include a plurality of openings 62 situated about the mixing chamber 60 to permit communication of the pressurized inert gas 14 to the mixing chamber. As illustrated, these openings 62 are located on a projecting portion of the end cap 22 which attaches to the inner housing 32. The inflater vessel includes an exit opening 64 situated at one end of the pressure vessel, or perhaps within the end cap 22. Situated within this exit opening is a rupturable disk 70. This disk may comprise a thin wafer of pure Nickel or nickel alloy. The heated media and/or flame generated by the ignited propellant will rupture the disk thereby opening the exit opening permitting the pressurized gas within the pressure vessel to exit therefrom to inflate the air bag. A pressure seal 74 such as an O-ring, weld, etc., may be provided about the disk 70.

The operation of the present invention is as follows. In response to a signal generated in a known manner indicative of a crash situation, a control signal is communicated to the squib 42 which ignites the material 30 causing same to burn at an elevated temperature to generate a known quantity of gas and flame. This heated media is communicated through the diffuser 50 and directly into the nozzle 56 and thereafter into the small mixing chamber 60 which had been filled with a small quantity of the inert gas 14. Initially, primarily due to the small volume of the mixing chamber, the inert gas 14 situated therein, in combination with the gases and heat generated by the material 30 is heated. In addition, the burst disk temperature is increased to a sufficient magnitude to weaken it to the point of rupture, thereby permitting the gases within the pressure vessel to escape therefrom to begin to inflate the air bag. Subsequently, the material 30 continues to burn and the gases exit the now ruptured disk 70. Exiting inert gas 14 from the pressure vessel mixes with the propellant reaction thereby increasing the temperature and volume of the stored gas as it exits the pressure vessel, enhancing the inflation of the air bag. The inflater 10 may optionally include a pressure sensor 78 for generating a signal indicative of the pressure of the stored gas.

A manifold 80 may be disposed about the entire pressure vessel or a portion thereof, having a plurality of openings 82 therein and positioned upstream of the air bag. This manifold in some respects will act as a heat shield protecting the air bag from the relatively high exhaust gases generated within the hybrid inflater 10. The inflater 10 may also include a means for attaching same to other parts of the inflation system such as end studs 86a, b secured thereto.

Many changes and modifications in the above described embodiment of the invention can, of course, be carried out without departing from the scope thereof. Accordingly, that scope is intended to be limited only by the scope of the appended claims.

We claim:

1. An inflater (1) for a cushion or air bag comprising:
a pressure vessel means (16) for storing a volume of stored gas at an elevated pressure, including at least one opening (24) adapted to communicated gas within the pressure vessel to a cushion (84),
a mixing chamber (60) defining a volume significantly smaller than the remaining volume of the pressure vessel;
exit means (70) for providing a rupturable seal in the pressure vessel;
generating means (30,32,40,42,52,54) responsive to a control signal, for generating heated media for increasing the temperature of the stored gas at least in the mixing chamber (60) and including nozzle means for directing the heated media into the mixing chamber (60) and onto the exit means for opening same, wherein the nozzle means (56) comprises a convergent nozzle wherein the pressure vessel is cylindrically shaped and wherein the inflater includes a cylindrically shaped manifold (80), spaced from and surrounding the pressure vessel and disposed about one opening (24), for distributing gases exiting the mixing chamber to a cushion (84), which cushion is disposed, about the manifold.

2. The inflater (10) as defined in claim 1 wherein the generating means further includes
diffuser means (52), immediately upstream of the nozzle means, for causing the media to flow into the nozzle means at a uniform velocity and a screen for filtering particulates in the media, wherein the screen is disposed in contact with and immediately upstream of the diffuser means.

* * * * *